United States Patent [19]
Backers et al.

[11] 3,947,880
[45] Mar. 30, 1976

[54] MAGNETIC RECORDING AND REPRODUCING APPARATUS WITH TAPE TENSION CONTROL

[75] Inventors: Franciscus Theodorus Backers; Johannes Hendrik Wessels, both of Eindhoven, Netherlands

[73] Assignee: U.S. Philips Corporation, New York, N.Y.

[22] Filed: Nov. 15, 1965

[21] Appl. No.: 507,745

Related U.S. Application Data

[63] Continuation of Ser. No. 190,314, April 26, 1962, abandoned.

[30] Foreign Application Priority Data

May 2, 1961  Netherlands ......................... 264297

[52] U.S. Cl. .................................... 360/71; 360/70
[51] Int. Cl.² G11B 15/18; G11B 27/22; G11B 27/28

[58] Field of Search .......................... 360/69, 70, 71

[56] References Cited
UNITED STATES PATENTS
3,378,646   4/1968   Shashoua et al ................. 179/100.2

Primary Examiner—Raymond F. Cardillo, Jr.
Attorney, Agent, or Firm—Frank R. Trifari

[57] ABSTRACT

In a magnetic tape recording system of the type in which the tape is wound helically on a drum and a rotating recording head is provided at the periphery of the drum, auxiliary signals are recorded on separate tracks of the tape before and after it passes the drum. The auxiliary signals are reproduced and compared during playback in order to produce a control signal for controlling the tension of the tape.

11 Claims, 2 Drawing Figures

INVENTOR
FRANCISCUS TH. BACKERS
JOHANNES H. WESSELS
BY
AGENT

MAGNETIC RECORDING AND REPRODUCING APPARATUS WITH TAPE TENSION CONTROL

This application is a continuation of application Ser. No. 190,314, filed Apr. 26, 1962 and now abandoned.

This invention relates to apparatus for recording and reproducing high frequency signals such as television signals; it relates in particular to such apparatus wherein the signals are recorded on a magnetic tape which is wound helically around a rotating cylinder and is moved along a rotating recording head or reproducing head in a manner such that one image raster of the video signal is recorded and read during one revolution of the head.

This type of recording apparatus is disclosed in German Pat. No. 927,999, May 23, 1955 and U.S. Pat. No. 2,998,495.

This system, in which during the recording process the head writes narrow tracks in the form of long lines lying obliquely on the tape, is extremely sensitive to elongation or shrinkage of the tape. If, for example, the tape has a shrinkage of 1% at the instant of reading as compared with the instant of recording the information recorded during a complete revolution of the cylinder is read in 99% of the revolution, the other 1% having become waiting time; the figure of 1% is of course an exaggeration and is given for illustrative purposes only.

In accordance with one aspect of the invention apparatus is provided which is adapted to read signals from the tape and measures variation of length of the tape which may have occurred after recording has taken place; apparatus is also provided which converts this variation into a control quantity which compensates the effect of said variation of length. It is thus possible to shift the irregularity produced by the aforesaid waiting time to the period of the image synchronizing pulses, where it has no disturbing effect. This provides an additional advantage in that it is also possible to place the irregularities occurring in each revolution when the head passes by the edge of the tape within the said period between the separate rasters.

The control quantity may be caused, to affect the tensile stress in the stretch of the tape which is in contact with the cylinder, preferably by causing the control quantity to action a braking member for the tape arranged in front of the cylinder.

According to a further aspect of the invention, two recording heads fed by the same auxiliary signal are arranged in front of and behind the cylinder; these two heads record two auxiliary tracks on the tape which are read by two similarly arranged reading heads, the latter having as outputs two signals the relative phase-shift of which depends on the variation of length of the tape. This relative phase-shift is then converted by a phase-sensitive device into a control quantity which counteracts the said variation of length.

The invention will now be described more fully with reference to the drawing.

Figure 1:
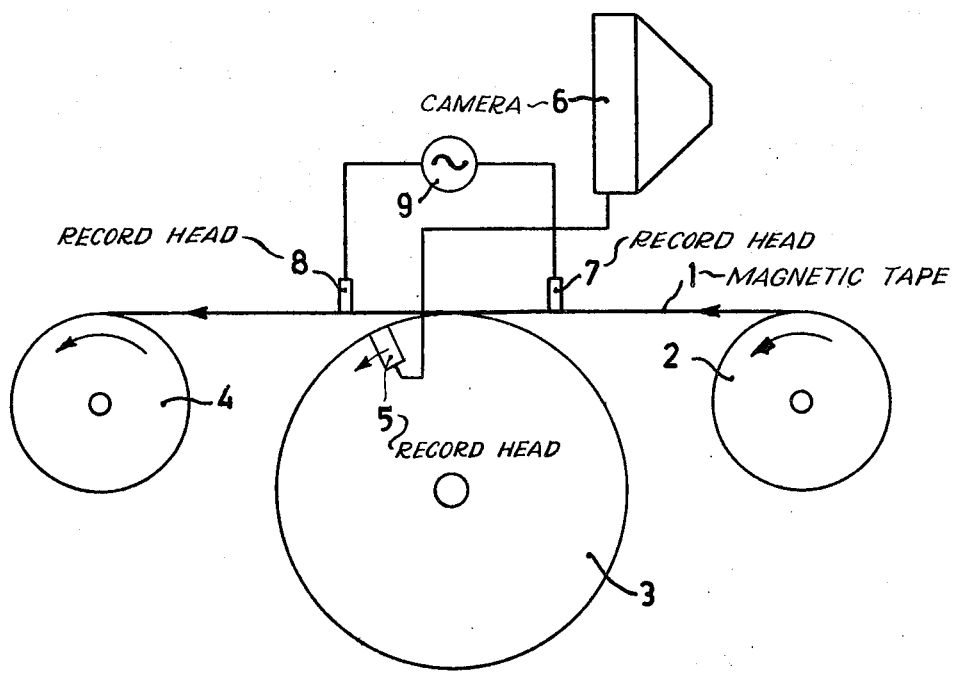
FIG. 1 shows diagrammatically a device according to the invention for recording a television signal on a tape.

FIG. 1 shows a magnetic tape 1, driven from a supply reel 2, to a takeup reel 4; the tape is wound around a drum or cylinder 3 in the form of a helix over its whole circumference; the drive may be a capstan or any known driving means. A recording head 5 is located inside the cylinder, and the television signal is fed to the head 5 from a camera 6, the signal being recorded in known manner in a narrow track on the tape in the form of straight lines lying obliquely on the tape.

The cylinder 3 is driven so that its rotation is in synchronism with the image synchronizing pulses of the television signal and the cylinder 3 performs a full revolution in the period between two consecutive synchronizing pulses. For this purpose the driving device (not shown) for the cylinder is controlled by the image synchronizing pulses in such a way, that the small irregularities in recording occurring in each revolution of the cylinder at the instants when the track written by the head passes by the edge of the tape fall in the image fly-back period, where they have a minimum disturbing effect.

Two additional recording heads 7 and 8 are provided just in front of and just behind the cylinder respectively, the tape 1 passing by these heads. These heads are both supplied with an alternating-current signal from an A-C supply source 9, the signals from the source 9 being recorded by heads 7 and 8 in two separate tracks.

Figure 2:
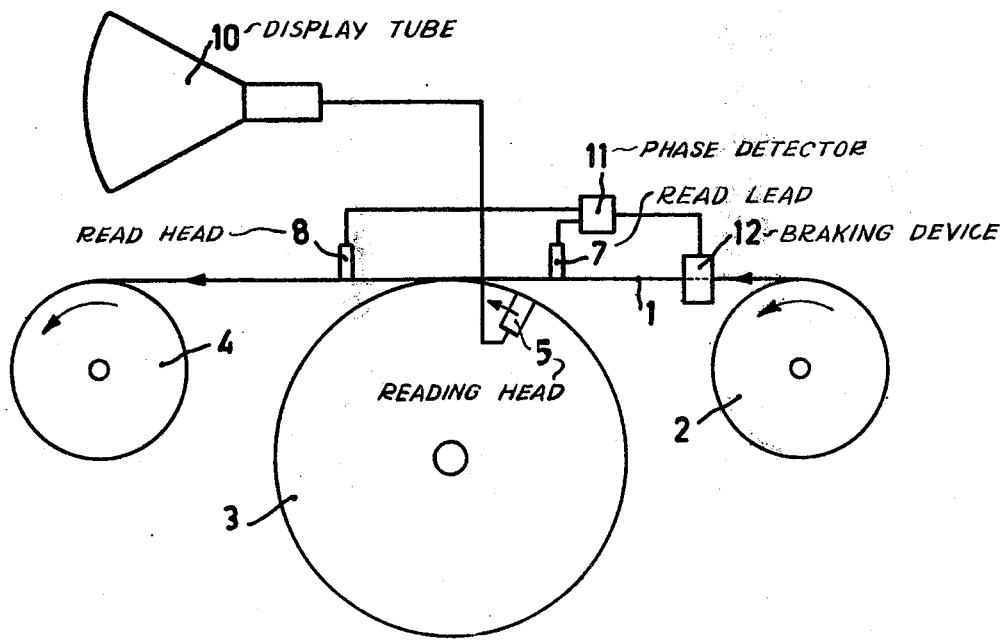
FIG. 2 shows the same or a similar device for reproducing the recorded signal.

In order to reproduce the signals thus recorded use is made of the apparatus shown in FIG. 2. It can be seen that this apparatus is substantially similar to that shown in FIG. 1. The heads 5, 7 and 8 of FIG. 2 now serve, however, as reading heads. The head 5 is connected to a television display tube 10 and both of the heads 7 and 8 are connected to an element 11, which converts any phase difference between the signals supplied by these heads into a control-voltage which is fed to a braking device 12; the tape 1 passes by and co-acts with the braking device 12 as it moves to the cylinder. The braking device may also be arranged on the reel 2 to co-act therewith.

If the tape does not exhibit elongation or shrinkage at the time of reproduction with respect to the time of recording, no phase difference will occur between the signals obtained from the reading heads 7 and 8. However, if such elongation or shrinkage has occurred, the element 11 will produce a control-voltage which is fed to the braking device 12. Depending on whether the control-voltage is produced due to elongation or shrinkage, its magnitude will be more or less positive or be more or less negative respectively and the braking effect on the tape produced by the device 12 will be increased or attenuated to a greater or smaller extent. The tensile stress in the tape is thus magnified or diminished, so that any shrinkage or elongation will be compensated.

A further method of compensating at least shrinkage consists in measuring the duration of the interval occurring in each revolution of the cylinder in the case of shrinkage of the tape and in producing a control-voltage varying with the duration of the said interval.

The control-voltage produced in response to elongation or shrinkage may also be caused to act upon the driving member of the takeup reel 4 instead of upon the braking device 12. When used in this manner, however, the control operates slower than when the braking device 12 is utilized.

While the invention has been described with respect to a specific embodiment, many modifications and variations thereof will be ready to those skilled in the art without departing from the inventive concept, the scope of which is set forth in the appended claims.

What is claimed is:

1. A system for compensating for elongation or shrinkage of a magnetic tape occurring after information signals have been recorded on the tape, comprising: a magnetic tape wound helically on a drum and adapted to co-act with a recording/reproducing magnetic head for recording/reproducing information signals on the tape located substantially at the periphery of the drum, recording means for recording auxiliary signals on the tape, reproducing means for reproducing said auxiliary signals, means responsive to the phase difference of said reproduced auxiliary signals for producing a control signal, and means energized by said control signal to change the tension on the tape during the reading of the information signals.

2. A system for compensating for elongation or shrinkage of a magnetic tape occurring after information signals have been recorded on the tape, comprising: a magnetic tape wound helically on a drum and adapted to co-act with a recording/reproducing magnetic head for recording/reproducing information signals on said tape located substantially at the periphery of the drum, recording means for recording auxiliary signals on the tape, reproducing means for reproducing said auxiliary signals, means responsive to said reproduced auxiliary signals for producing a control signal, a braking device co-acting with said tape and located at the portion of the tape preceding the drum in the direction of movement of the tape, said braking device being energized by said control signal to change the tension on the tape during the reading of the information signals.

3. A system for compensating for elongation or shrinkage of a magnetic tape occurring after information signals have been recorded on the tape, comprising: a magnetic tape wound helically on a drum and adapted to co-act with a recording/reproducing magnetic head for recording/reproducing information on said tape located substantially at the periphery of the drum, means for producing auxiliary signals and for applying said auxiliary signals to first and second auxiliary magnetic recording heads, said auxiliary heads being arranged adjacent to the moving tape to record said auxiliary signals thereon, a pair of reproducing magnetic heads for reproducing said auxiliary signals, means responsive to the phase difference of said reproduced auxiliary signals for producing a control signal, and means energized by said control signal to change the tension on the tape during the reading of the information signals.

4. A system for compensating for elongation or shrinkage of a magnetic tape occurring after information signals have been recorded on the tape, comprising: a magnetic tape wound helically on a drum and adapted to co-act with a recording/reproducing magnetic head for recording/reproducing information on said tape in oblique tracks located substantially at the periphery of the drum, means for producing auxiliary signals and for applying said auxiliary signals to first and second stationary auxiliary magnetic recording heads, said auxiliary heads being arranged in front of and behind said drum respectively adjacent to the tape to record said auxiliary signals in separate longitudinal tracks thereon, a pair of stationary reproducing magnetic heads for reproducing said auxiliary signals, means responsive to the phase difference of said reproduced auxiliary signals for producing a control signal, and means energized by said control signal to change the tension on the tape during the reading of the information signals.

5. A control system for use in a system of the type in which a movable record medium describes a helical path comprising, in combination
   means for driving said medium through a first helical path,
   said means for recording a pair of control tracks on said medium during a first passage of said medium through said first helical path,
   said control tracks having information recorded thereon as to the tension in said medium as it describes said first helical path,
   said second means being arranged to reproduce said information recorded on said control tracks during a second passage of said medium through a second helical path similar to said first helical path, and
   means responsive to said reproduced information for controlling the operation of said driving means to cause the tension in said medium during said second passage to be substantially the same as during said first passage of said medium irrespective of the velocity of said medium during said second passage.

6. A control system for use in a system of the type in which a movable record medium describes a helical path,
   said medium having recorded thereon a pair of control tracks which include information as to the proper tension to be exerted on said medium as it describes said helical path,
   said control system comprising, in combination,
   means for driving said medium through helical path,
   means for reproducing said information recorded on said control tracks, and
   means responsive to said reproduced information for controlling the operation of said driving means to cause said proper tension to be exerted on said medium as it describes said helical path irrespective of the velocity of said medium as it describes said helical path.

7. A control system for use in a signal recording and reproducing system of the type in which a movable record medium describes a helical path as it is driven past the signal recording and reproducing device comprising, in combination,
   means for driving said medium through a first helical path,
   second and third signal recording and reproducing devices arranged to record in a pair of control tracks on said medium information as to the tension in said medium as it describes said first helical path,
   said second and third devices being arranged to reproduce said information recorded on said control tracks during a second passage of said medium over a second helical path similar to said first helical path, and
   means coupled between said second and third devices and said driving means during said second passage and responsive to said reproduced information for controlling the operation of said driving means to cause the tension in said medium during said second passage to be substantially the same as during said first passage of said medium irrespective of said medium's velocity during either said first or second passages.

8. A control system for use in a system of the type in which a movable record medium describes a helical path as it is driven past a signal recording and reproducing device, said medium having recorded thereon a pair of control tracks which include information as to the proper amount of tension to be exerted on said medium as it describes said helical path, said control system comprising, in combination, means for driving said medium over said helical path, second and third signal reproducing devices arranged to reproduce said information recorded on said control tracks, and means responsive to said reproduced information for controlling the operation of said driving means to cause said proper amount of tension to be exerted on said medium as it describes said helical path irrespective of the velocity of said medium as it describes said helical path.

9. A control system for use in a system including means for driving a record medium over a helical path comprising, in combination, a first signal recording and reproducing device positioned in signal transferring relationship with said medium near the point at which said medium begins to describe said helical path, a second signal recording and reproducing device positioned in signal transferring relationship with said medium near the point at which said medium completes said helical path, means to apply a control signal to said devices so that said devices record in a pair of control tracks on said medium information as to the tension in said medium as it describes said helical path, said devices being arranged to reproduce said information recorded on said control tracks during a second passage of said medium over said helical path, and means coupled to said devices during said second passage and responsive to said reproduced information for controlling the operation of said driving means to cause the tension in said medium during said second passage to be substantially the same as during said first passage of said medium over said helical path irrespective of said medium's velocity during either of said first or second passages.

10. A control system for use in a system including means for driving a record medium over a helical path, said record medium having recorded thereon a pair of control tracks which include information as to the proper tension on said medium as it describes said helical path, said control system comprising, in combination, a first signal reproducing device positioned near the point at which said medium begins to describe said helical path for reproducing the information recorded on one of said control tracks, a second signal reproducing device positioned near the point at which said medium completes said helical path for reproducing the information recorded on the other one of said control tracks, and means coupled to said first and second signal reproducing devices and responsive to said reproduced information for controlling the operation of said driving means to cause said proper tension to be exerted on said medium irrespective of the medium's velocity as it describes said helical path.

11. A control system for use in a system including means for driving a record medium having information recorded thereon over a helical path, said control system comprising, in combination, a first signal pick-up device positioned near the point at which said medium begins to describe said helical path for producing a first control signal from said recorded information, a second signal pick-up device positioned near the point at which said medium completes said helical path for producing a second control signal from said recorded information, said first and second control signals being of the same frequency but differing in phase according to change in the tension on said medium as it describes said helical path, and means responsive to said control signals for controlling the operation of said driving means according to the phase error between said control signals so that a controlled tension is exerted on said medium irrespective of said medium's velocity as it describes said helical path.

* * * * *

UNITED STATES PATENT AND TRADEMARK OFFICE
CERTIFICATE OF CORRECTION

PATENT NO. : 3,947,880
DATED : March 30, 1976
INVENTOR(S) : Franciscus T. Backers et al It is certified that error appears in the above-identified patent and that said Letters Patent are hereby corrected as shown below:

Claim 5, line 6, cancel "said" and insert -- second --;

Signed and Sealed this

Sixteenth Day of November 1976

[SEAL]

Attest:

RUTH C. MASON
*Attesting Officer*

C. MARSHALL DANN
*Commissioner of Patents and Trademarks*